United States Patent [19]
Watahiki et al.

[11] Patent Number: 5,590,018
[45] Date of Patent: Dec. 31, 1996

[54] ARRANGEMENT OF ARRESTORS IN A GAS-INSULATED SWITCHGEAR

[75] Inventors: Satoshi Watahiki; Shingo Shirakawa, both of Hitachi, Japan

[73] Assignee: Hitachi, Ltd., Tokyo, Japan

[21] Appl. No.: 501,878

[22] Filed: Jul. 13, 1995

[30] Foreign Application Priority Data

Jul. 25, 1994 [JP] Japan ..................... 6-172271

[51] Int. Cl.⁶ .................................... H02B 1/04
[52] U.S. Cl. .................... 361/612; 361/40; 361/604
[58] Field of Search ............... 361/38–40, 117, 361/602–604, 605, 611, 612, 618–621; 200/50 AA; 218/44, 84, 152; 307/112

[56] References Cited

U.S. PATENT DOCUMENTS

| | | | |
|---|---|---|---|
| 3,576,509 | 4/1971 | Bernatt | 337/8 |
| 3,857,006 | 12/1974 | Daimon | 200/148 F |
| 4,745,522 | 5/1988 | Mitomo | 361/604 |
| 4,967,307 | 10/1990 | Itou | 361/355 |
| 5,001,599 | 3/1991 | Itou | 361/604 |

FOREIGN PATENT DOCUMENTS

63-38924  8/1988  Japan .

*Primary Examiner*—Gerald P. Tolin
*Attorney, Agent, or Firm*—Fay, Sharpe, Beall, Fagan, Minnich & McKee

[57] ABSTRACT

The arrestors of a compact gas insulated switchgear are to be connected to gas insulated main buses. The arrestors represent three phases, and are arranged in such a manner that the distance from a main bus which is located at the outermost position among a plurality of main buses to at least one arrestor for one phase is differentiated from the distances from the outermost main bus to at least one of the remaining arrestors. As a result, the area or the width required for installing the arrestors is minimized, the length of the main buses is shortened, and the installation area of the gas insulated switchgear as a whole can be reduced.

6 Claims, 6 Drawing Sheets

19
ARRANGEMENT OF ARRESTORS IN A GAS-INSULATED SWITCHGEAR

BACKGROUND OF THE INVENTION

The present invention relates to a gas insulated switchgear and, in particular, relates to a gas insulated switchgear in which arrestors are connected to corresponding gas insulated main buses.

A surge voltage coming into a substation from a power transmission line is generally limited in its peak value through the operation of an arrestor, and thereafter reaches terminals of respective electrical machines and apparatuses. However, when the distance between the arrestor and the terminal of an electrical machine and apparatus to be protected is long, reflection waves are caused at the respective terminals of the electrical machines and apparatuses, and a higher voltage than the limiting voltage of the arrestor caused by superposition of the reflection waves is applied to the respective electrical machines and apparatuses.

Since the deviation therebetween increases as the distance between the arrestor and the terminal of the electrical machine and apparatus to be protected increases, it is necessary to dispose an arrestor as close as possible to the electrical machine and apparatus to be protected in order that the arrestor fully achieves its protective effect. Further it is understood that if the distance is within 50 m, a sufficiently protective performance of the arrestor is achieved. In a normal substation, arrestors are disposed at a power transmission line lead-in port; however, in the of a large scale substation, in particular a substation for a 1000 KV power transmission system, the distance from the power transmission line lead-in port to an opened contact end portion of a circuit breaker may exceed 50 m, which necessitates to additional arrestors at gas insulated main buses other than at the power transmission line lead-in port.

JP-B-63-38924(1988) discloses. An example of a phase isolated double bus type gas insulated switchgear. A proposed application of arrestor units to the switchear shown is explained with reference in FIG. 7 of this publication is explained with reference to FIG. 4 through FIG. 6 of the present drawings.

Figure 4:
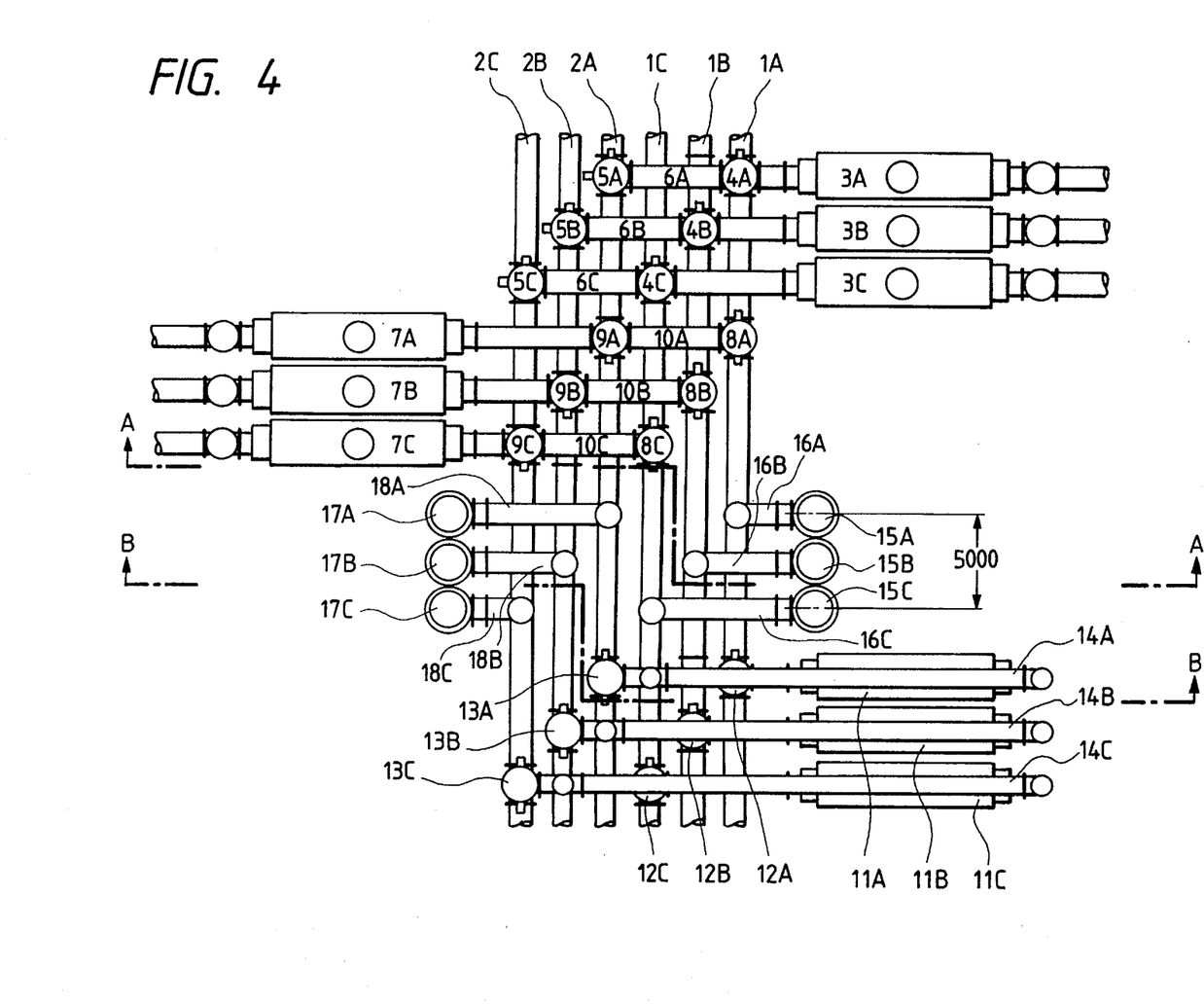
FIG. 4 is a plan view of a conventional example comparable to the gas insulated switchgear as shown in FIG. 1.
Figure 5:
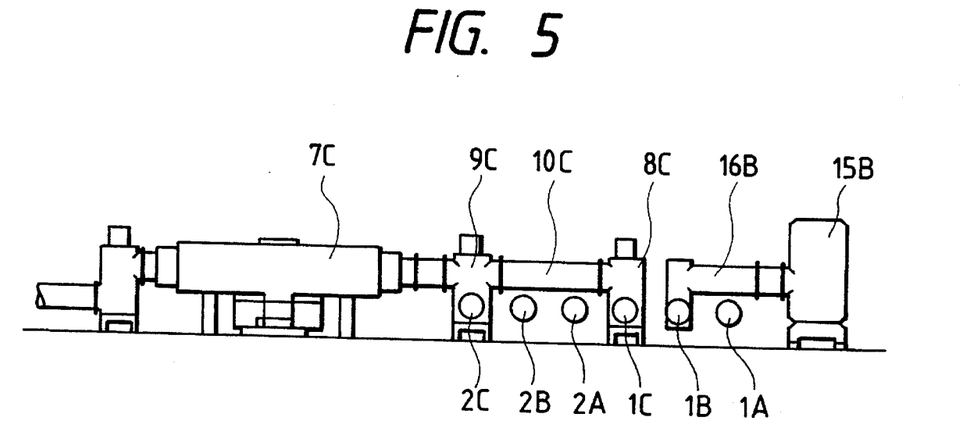
FIG. 5 is a side view seen from A—A in FIG. 4.
Figure 6:
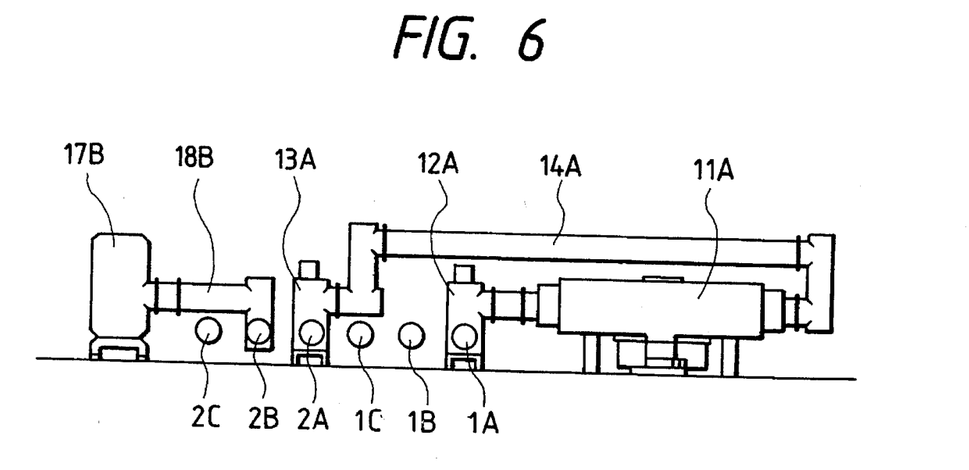
FIG. 6 is a side view seen from B—B in FIG. 4.
Figure 7:
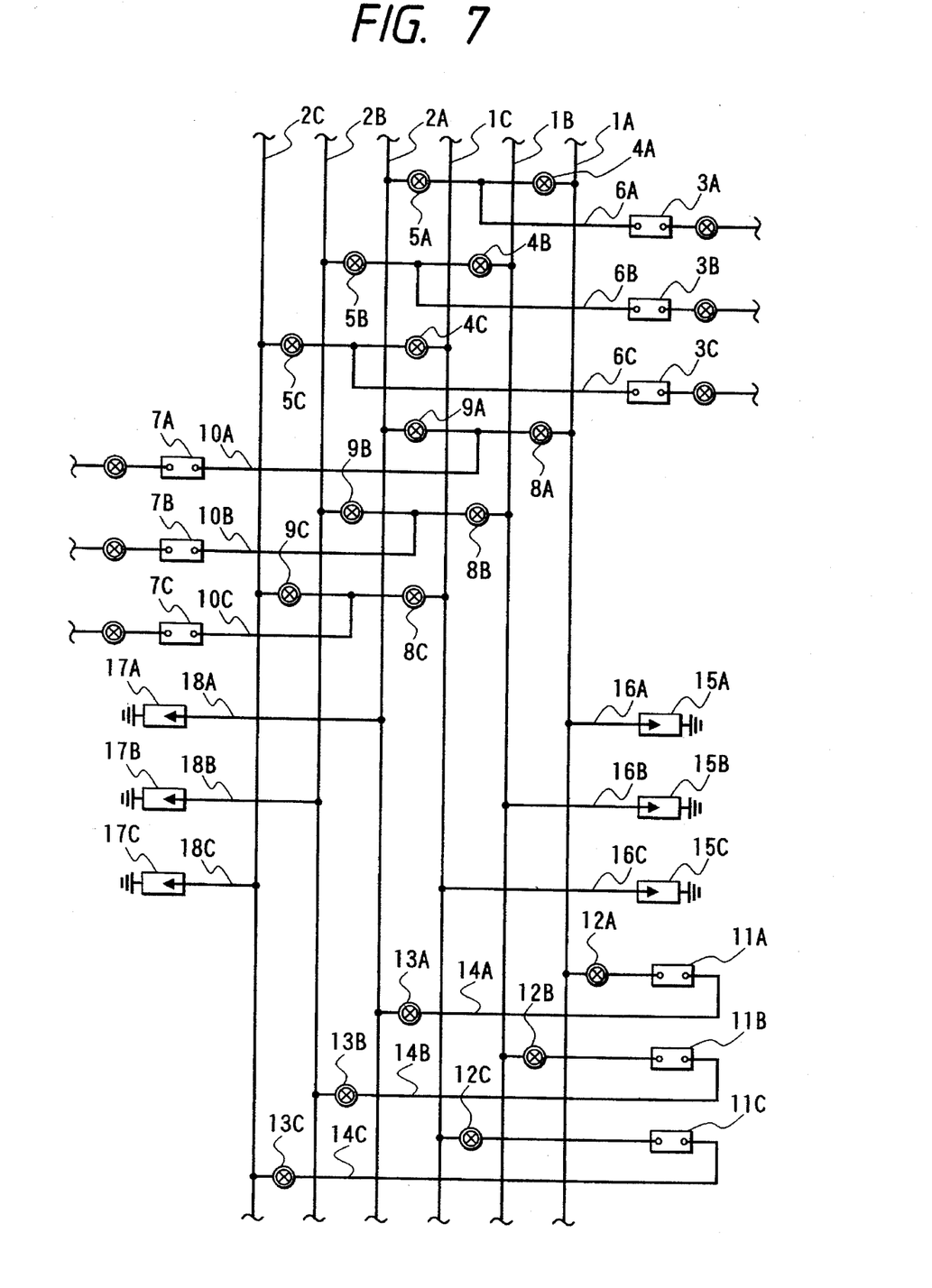
FIG. 7 is a connection diagram of the gas insulated switchgear as shown in FIG. 1.

First main buses 1A, 1B and 1C and second main buses 2A, 2B and 2C of phase isolated type gas insulated main buses are arranged over substantially the same plane, in substantially in parallel, and with substantially the same spacing. The first main buses 1A, 1B and 1C and the second main buses 2A, 2B and 2C are connected to a power transmission line via line use gas insulated switchgear units 3A, 3B, 3C, disconnecting switches 4A, 4B, 4C and 5A, 5B, 5C and line buses 6A, 6B, 6C. Similarly, the first main buses 1A, 1B, 1C and the second main buses 2A, 2B, 2C are connected to a transformer via transformer-use gas insulated switchgear units 7A, 7B, 7C, disconnecting switches 8A, 8B, 8C and 9A, 9B, 9C and transformer connection buses 10A, 10B, 10C. Further, the first main buses 1A, 1B and 1C are connected with the second main buses 2A, 2B and 2C via bus-connection-use gas insulated switchgear units 11A, 11B, 11C, disconnecting switches 12A, 12B, 12C and 13A, 13B, 13C and connecting buses 14A, 14B, 14C. These connecting buses 14A, 14B, 14C are arranged to extend over the switchgear units in two layers so as to reduce the installation area of the gas insulated switchgear.

The size of a gas insulated switchgear constituted by such main constitutional components is huge and the distance from the arrestors which are normally disposed at the power transmission line lead-in port to the open-end portions of the circuit breakers in respective switchgear units exceeds 50 m. Therefore, for the reason explained above, arrestors 15A, 15B, 15C and 17A, 17B, 17C are disposed at positions in which the distance from the open-end portions of the circuit breakers in the respective switchgear units does not exceed 50 m. These arrestors are connected to respective corresponding main buses 1A, 1B, 1C and 2A, 2B, 2C via arrestor-connection-leading-out buses 16A, 16B, 16C and 18A, 18B, 18C.

In an arrangement of these arrestors, the distance between the arrestors 15A, 15B, 15C and the outermost main bus 1A among the plurality of the main buses, and the distance between the arrestors 17A, 17B, 17C and the outermost main bus 2C were determined to be substantially the same for the respective three phases. As a result, the three-phase arrestors were arranged substantially linearly along the axial direction of the main buses, and the area or width required for installing the the three phase arrestors absolutely depended on the size of a single arrestor.

However, due to the recent appreciation of land values, it has become difficult to obtain a necessary site for a substation, which forces to construction of electrical machines and apparatuses for the substation to be more compact.

SUMMARY OF THE INVENTION

An object of the present invention is to provide a gas insulated switchgear which requires a reduced the installation area.

For achieving the above object, a gas insulated switchgear according to the present invention includes gas insulated main buses, gas insulated switchgear units arranged at positions substantially perpendicular to the gas insulated main buses, and arrestors for three phases each connected to the corresponding gas insulated main bus. The gas insulated switchear is characterized in that the arrestors are disposed in such a manner that the distance between at least one of the arrestors for one phase and the gas insulated main bus located at an outermost position is different from the distance between the arrestor for another phase and the gas insulated main bus located at the outermost position.

Further, in a gas insulated switchgear according to the present invention which includes gas insulated main buses, and gas insulated switchgear units arranged at positions substantially perpendicular to the gas insulated main buses, arrestors for three phases are each connected to the corresponding gas insulated main bus via a leading-out bus, the respective arrestors are arranged substantially in parallel with the gas insulated main buses and the width of the arrestor in the direction of the gas insulated main bus is designed larger than that of the leading-out bus. The gas insulated switchgear is characterized in that the respective arrestors are disposed so as to partly overlap each other in the direction of the gas insulated main buses.

Still further, in a gas insulated switchgear according to the present invention which includes gas insulated main buses, gas insulated switchgear units arranged at positions substantially perpendicular to the gas insulated main buses, and a plurality of arrestors each connected to the corresponding gas insulated main bus via a leading-out bus, wherein the respective arrestors are arranged substantially in parallel with the gas insulated main buses and the width of the arrestor in the direction of the gas insulated main bus is designed larger than that of the leading-out bus, the gas insulated switchgear is characterized in that at least one of the arrestors is disposed so as to face the adjacent leading-out bus.

According to the present invention, within the gas insulated switchgear, the area or the width required for installing the arrestors to be connected to the corresponding gas insulated main buses is not largely dependent upon the size of a single arrestor, and the length of the gas insulated main buses can be shortened. As a result, the installation areas of the gas insulated switchgear as a whole is reduced.

DESCRIPTION OF THE PREFERRED EMBODIMENTS

Hereinbelow, embodiments of the present invention are explained with reference to the drawings.

Figure 1:
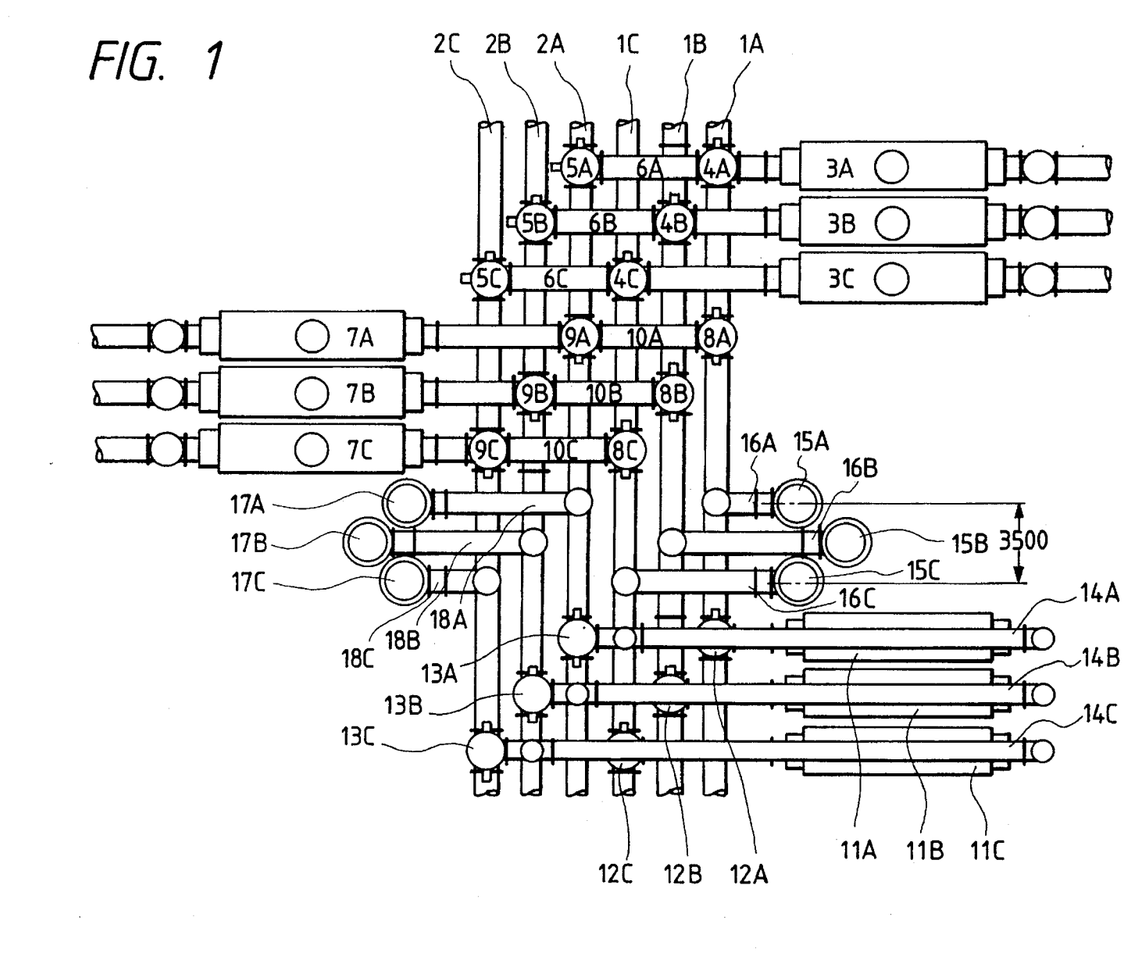
FIG. 1 is a plan view of a first embodiment of a gas insulated switchgear to which the present invention is applied.
Figure 2:
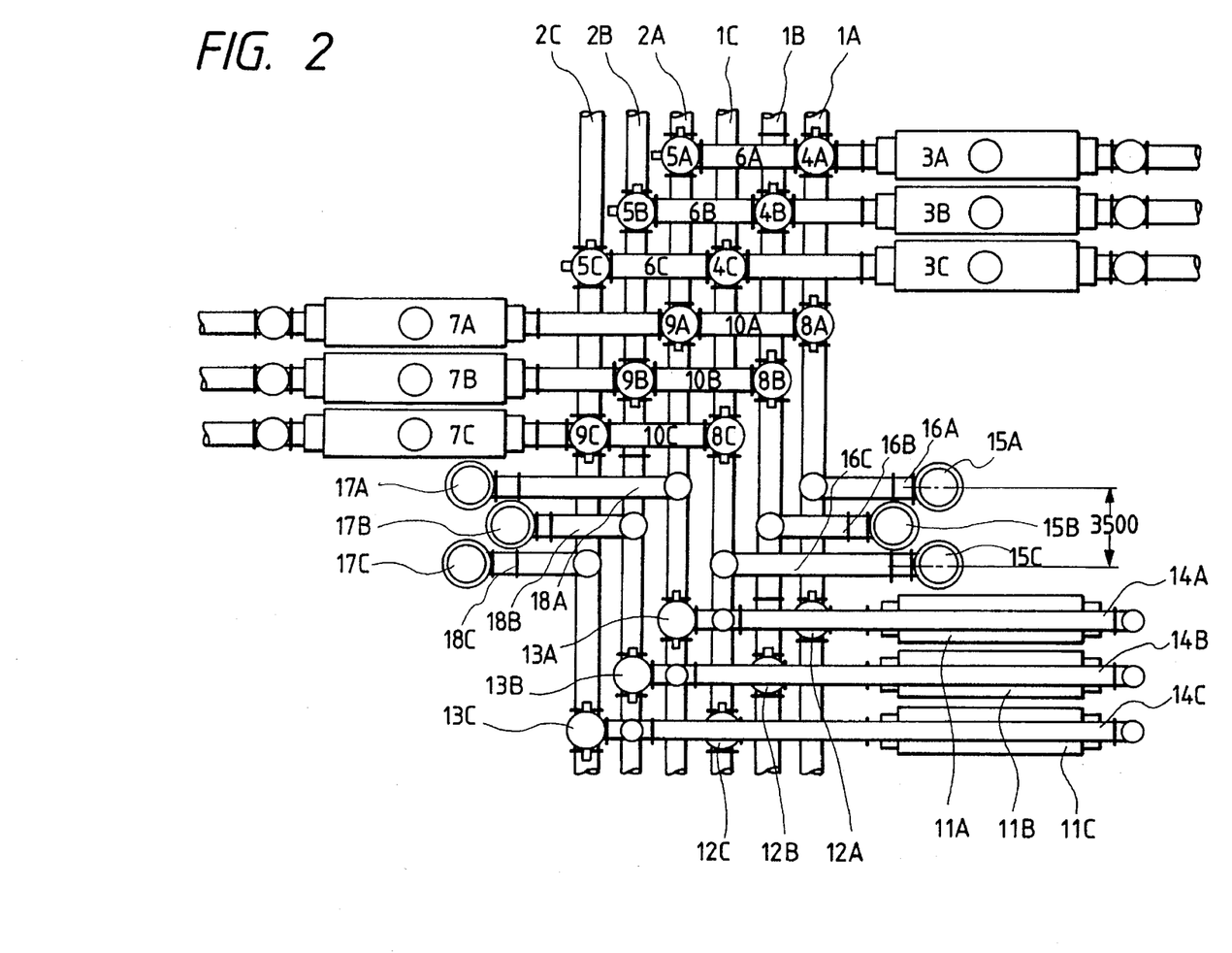
FIG. 2 is a plan view of a second embodiment of a gas insulated switchgear to which the present invention is applied.
Figure 3:
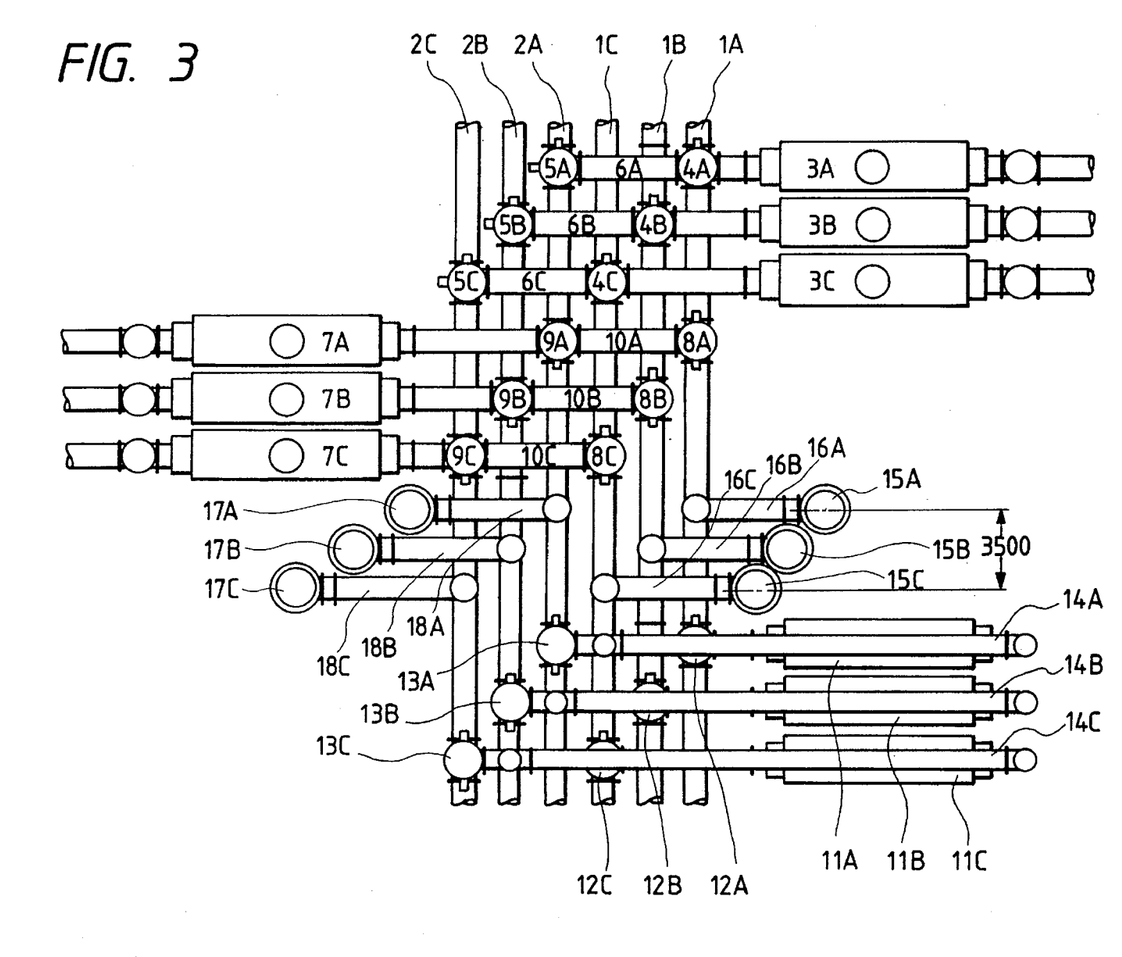
FIG. 3 is a plan view of a third embodiment of a gas insulated switchgear to which the present invention is applied.

FIGS. 1, 2 and 3 are plan views of phase isolated double bus type gas insulated switchgears embodiments according to the present invention. In the gas insulated switchgears of these embodiments, like the conventional example as shown and explained in connection with FIG. 4, first main buses 1A, 1B and 1C and second main buses 2A, 2B and 2C are phase isolated type gas insulated main buses, and are arranged over substantially the same plane substantially in parallel, and with substantially the same spacing. The first main buses 1A, 1B, 1C and the second main buses 2A, 2B, 2C are connected to a power transmission line via line-use gas insulated switchgear units 3A, 3B, 3C, disconnecting switches 4A, 4B, 4C and 5A, 5B, 5C and line buses 6A, 6B, 6C. These line-use gas insulated switchgear units 3A, 3B, 3C are disposed so as to be substantially perpendicular with respect to the main buses. Similarly, the first main buses 1A, 1B, 1C and the second main buses 2A, 2B, 2C are connected to a transformer via transformer-use gas insulated switchgear units 7A, 7B, 7C, disconnecting switches 8A, 8B, 8C and 9A, 9B, 9C and transformer connection buses 10A, 10B, 10C. These transformer-use gas insulated switchgear units 7A, 7B, 7C are also disposed so as to be substantially perpendicular with respect to the main buses. Further, the first main buses 1A, 1B, 1C are connected with the second main buses 2A, 2B, 2C via bus-connection-use gas insulated switchgear units 11A, 11B, 11C, disconnecting switches 12A, 12B, 12C and 13A, 13B, 13C and connecting buses 14A, 14B, 14C. These bus-connection-use gas insulated switchgear units 11A, 11B, 11C are also disposed so as to be substantially perpendicular with respect to the main buses.

The gas insulated switchgear shown in FIG. 1 is for a 1000 KV power transmission system and is extremely huge, and since the distance from the arrestors which are normally disposed at the power transmission line lead-in port to the open-end portions of the circuit breakers in respective switchgear units exceeds 50 m, arrestors 15A, 15B, 15C and 17A, 17B, 17C are disposed at positions in which the distance from the open-end portions of the circuit breakers in the respective switchgear units does not exceed 50 m. The arrestors 15A, 15B, 15C are connected to the corresponding first main buses 1A, 1B, 1C via arrestor arrestor-connection-use leading-out buses 16A, 16B, 16C. similarly, the arrestors 17A, 17B, 17C are connected to the corresponding second main buses 2A, 2B, 2C via A arrestor-connection-use leading-out buses 18A, 18B, 18C.

Hereinbelow, features are explained of the arrangement of the arrestors connected to the respective main buses as shown in FIGS. 1 through 3. With regard to distances between the main bus 1A and the respective arrestors 15A, 15B, 15C, in the FIG. 1 arrangement the arrestor 15B at the intermediate phase is arranged at a further remote position with respect to the main bus 1A than are the arrestors 15A, 15C, of other two phases and the arrestors 15A and 15C are arranged close to the main bus at the positions of substantially the same distance. According to the plan view aspect, the arrestors are arranged in an isosceles triangle shape. Similarly, with regard to distances between the main bus 2C and the respective arrestors 17A, 17B, 17C, in the FIG. 1 arrangement, the arrestor 17B at the intermediate phase is arranged at a further remote position with respect to the main bus 2C than are the arrestors of the other two phases 17A, 17C, and the arrestors 17A and 17C are arranged close to the main bus at the positions of substantially the same distance. According to the plan view aspect, the arrestors are arranged in an isosceles triangle shape.

In the arrangement used in the conventional example as shown in FIG. 4 in which the arrestors are arranged linearly along the axial direction of the main buses, the area or the width required for installing the arrestors for three phases is determined dependent upon the size of a single arrestor. For example, in the case of a UHVZLA (Ultra High Voltage (of more than 1000 KV) Zinc Oxide Type Arrestor) at the least installation width reqires about 5000 mm.

However, when arranging the arrestors isosceles triangle shape according to the present embodiment, the size of the arrestor 15B at the intermediate phase affects slightly the arrangement of the arrestors 15A, 15C for the remaining two phases, whereby the arrestors 15A, 15C can be disposed close to the leading-out bus 16B for the arrestor 15B at the position in the intermediate phase. Accordingly, in case of the UHVZLA the installation width can be reduced to about 3500 mm, and as a result the entire length of the main buses is shortened.

FIG. 2 is a plan view of the second embodiment. According to the present embodiment as shown in FIG. 2, with regard to distances between the main bus 1A and the respective arrestors 15A, 15B, 15C, the arrestor 15B at the intermediate phase is clser to the main bus 1A than are the arrestors 15A, 15C, of the other two phases, and the arrestors 15A and 15C are arranged remote from the main bus at positions of substantially the same distance. According to the plan view aspect the arrestors are arranged in an inverted isosceles triangle shape in comparison with the FIG. 1 arrangement. Similarly, with regard to distances between the main bus 2C and the respective arrestors 17A, 17B, 17C, the arrestor 17B at the intermediate phase is arranged at a closer position with respect to the main bus 2C than are the arrestors 17A, 17C, of the other two phases, and the arrestors 17A and 17C are arranged remote from the main bus at positions of substantially the same distance. According to the plan view aspect, the arrestors are arranged in an inverted isosceles triangle shape in comparison with the FIG. 1 arrangement.

When arranging the arrestors in an inverted isosceles triangle shape according to the present embodiment, the size of the arrestor 15B at the intermediate phase affects slightly the arrangement of the arrestors 15A, 15C for the other two phases, whereby the leading-out buses 16A, 16C for the arrestors 15A, 15C can be disposed close to the arrestor 15B at the position in the intermediate phase. Accordingly, in the case of the UHVZLA the installation width can be reduced to about 3500 mm. As a result, the entire length of the main buses is shortened.

FIG. 3 is a plan view of the third embodiment, in which the distances between the outermost main bus and the respective arrestors are varied for all of the three phases. FIG. 3 is an example of such arrangements wherein the lengths of the arrestor-use leading-out buses 16A, 16B, 16C are determined to be equal so as to realize a common utilization of the leading-out buses. In the present embodiment, like the FIG. 1 and FIG. 2 embodiments, the size of one arrestor slightly affects the arrangement of the remaining arrestors for the other two phases; for example, the arrestor 15B and the leading-out bus 16B thereof are arranged close to the leading-out bus 16A, and further, the arrestor 15C and the leading-out bus 16C thereof are arranged close to the leading-out bus 16B. Accordingly, in the case of the UHVZLA the installation width can be reduced to about 3500 mm. As a result, the entire length of the main buses is shortened. Further, according to the present embodiment the lengths of the arrestor-use leading-out buses 16A, 16B, 16C for the respective arrestors are equal, and therefore reflection-waves with respect to a surge voltage are equalized for the respective phases, which is desirable with respect to the performance of the arrestors.

According to the arrangement of the constitutional electrical machines and apparatuses in the gas insulated switchgear of the present invention as explained heretofore, the area or the width required for installing the bus use arrestors is minimized, and as a result the length of the main buses is shortened. Further the installation area of the gas insulated switchgear as a whole can be reduced.

We claim:

1. A gas insulated switchgear, comprising:

a first set of isolated three-phase main buses disposed on a horizontal plane and running in a first direction;

a second set of isolated three-phase main buses disposed on said horizontal plane and running in parallel with said first set of isolated three-phase main buses;

a first set of gas insulated three-phase switchgear units disposed at a side of said first set of isolated three-phase main buses that is remote from said second set of isolated three-phase main buses;

three first connecting buses extending in a second direction perpendicular to the first direction, each of said first connecting buses connecting a respective one of said first set of isolated three-phase main buses and a respective one of said second set of isolated three-phase main buses with a respective one of said first set of gas insulated three-phase switchgear units of a corresponding phase via a respective disconnecting switch;

a second set of gas insulated three-phase switchgear units disposed at a side of said second set of isolated three-phase main buses that is remote from said first set of isolated three-phase main buses;

three second connecting buses extending in the second direction perpendicular to the first direction, each of said second connecting buses connecting a respective one of said first set of isolated three-phase main buses and a respective one of said second set of isolated three-phase main buses with one of said second set of gas insulated three-phase switchgear units of the corresponding phase via respective disconnecting switches;

a first set of first, second, and third isolated vertical type three-phase cylindrical arrestors disposed adjacent to said first set of gas insulated switchgear units and at the same side thereof with respect to said first set of isolated three-phase main buses, said first set of isolated vertical type three-phase cylindrical arrestors being arranged as three apices of a first triangle occupying said horizontal plane, wherein said second cylindrical arrestor of said first set of isolated vertical type three-phase cylindrical arrestors is located intermediate, along said first direction, of said first and third cylindrical arrestors of said first set of isolated vertical type three-phase cylindrical arrestors, a distance between said first and third cylindrical arrestors of said first set of isolated vertical type three-phase cylindrical arrestors in said first direction as a measurement axis being less than the diameter of said second cylindrical arrestor of said first set of isolated vertical type three-phase cylindrical arrestors;

three first leading-out buses extending in the second direction, each connecting one of said first set of isolated three-phase main buses with one of said first set of isolated vertical type three-phase cylindrical arrestors of a corresponding phase;

a second set of first, second, and third isolated vertical type three-phase cylindrical arrestors disposed adjacent to said second set of gas insulated switchgear units and at the same side thereof with respect to said second set of isolated three-phase main buses, said second set of isolated vertical type three-phase cylindrical arrestors being arranged as three apices of a second triangle occupying said horizontal plane, wherein said second cylindrical arrestor of said second set of isolated vertical type three-phase cylindrical arrestors is located intermediate, along said first direction, of said first and third cylindrical arrestors of said second set of isolated vertical type three-phase cylindrical arrestors, a distance between said first and third cylindrical arrestors of said second set of isolated vertical type three-phase cylindrical arrestors in said first direction as a measurement axis being less than the diameter of said second cylindrical arrestor of said second set of isolated vertical type three-phase cylindrical arrestors; and three second leading-out buses extending in the second direction, each connecting one of said second set of isolated three-phase main buses with one of said second set of isolated vertical type three-phase cylindrical arrestors of a corresponding phase.

2. A gas insulated switchgear according to claim 1, wherein said first and second triangles are isosceles triangles.

3. A gas insulated switchgear according to claim 2, wherein said three first connecting buses extend in a straight line from said respective ones of said first and second sets of isolated three-phase main buses to said one of said first set of gas insulated three-phase switchgear units of a corresponding phase via said respective disconnecting switches; and wherein said three second connecting buses extend in a straight line from said respective ones of said first and second sets of isolated three-phase main buses to said one of said second set of gas insulated three-phase switchgear units of a corresponding phase via said respective disconnecting switches.

4. A gas insulated switchgear according to claim 1, wherein said three first connecting buses extend in a straight line from said respective ones of said first and second sets of isolated three-phase main buses to said one of said first set of gas insulated three-phase switchgear units of a corresponding phase via said respective disconnecting switches; and wherein said three second connecting buses extend in a straight line from said respective ones of said first and second sets of isolated three-phase main buses to said one of said second set of gas insulated three-phase switchgear units of a corresponding phase via said respective disconnecting switches.

5. A gas insulated switchgear, comprising:

a first set of isolated three-phase main buses disposed on a horizontal plane and running in a first direction;

a second set of isolated three-phase main buses disposed on said horizontal plane and running in parallel with said first set of isolated three-phase main buses;

a first set of gas insulated three-phase switchgear units disposed at a side of said first set of isolated three-phase main buses that is remote from said second set of isolated three-phase main buses;

three first connecting buses extending in a second direction perpendicular to the first direction, each of said first connecting buses connecting a respective one of said first set of isolated three-phase main buses and a respective one of said second set of isolated three-phase main buses with a respective one of said first set of gas insulated three-phase switchgear units of a corresponding phase via a respective disconnecting switch;

a second set of gas insulated three-phase switchgear units disposed at a side of said second set of isolated three-phase main buses that is remote from said first set of isolated three-phase main buses;

three second connecting buses extending in the second direction perpendicular to the first direction, each of said second connecting buses connecting a respective one of said first set of isolated three-phase main buses and a respective one of said second set of isolated three-phase main buses with one of said second set of gas insulated three-phase switchgear units of the corresponding phase via respective disconnecting switches;

a first set of first, second, and third isolated vertical type three-phase cylindrical arrestors disposed adjacent to said first set of gas insulated switchgear units and at the same side thereof with respect to said first set of isolated three-phase main buses, said first set of isolated vertical type three-phase cylindrical arrestors being arranged along a first line inclined with respect to the first direction, wherein said second cylindrical arrestor of said first set of isolated vertical type three-phase cylindrical arrestors is located intermediate, along said first direction, of said first and third cylindrical arrestors of said first set of isolated vertical type three-phase cylindrical arrestors, a distance between said first and third cylindrical arrestors of said first set of isolated vertical type three-phase cylindrical arrestors in said first direction as a measurement axis being less than the diameter of said second cylindrical arrestor of said first set of isolated vertical type three-phase cylindrical arrestors;

three first leading-out buses extending in the second direction and having substantially equal lengths, each of said first leading-out buses connecting one of said first set of isolated three-phase main buses with one of said first set of isolated vertical type three-phase cylindrical arrestors of a corresponding phase;

a second set of first, second, and third isolated vertical type three-phase cylindrical arrestors disposed adjacent to said second set of gas insulated switchgear units and at the same side thereof with respect to said second set of isolated three-phase main buses, said second set of isolated vertical type three-phase cylindrical arrestors being arranged along a second line inclined with respect to the first direction, wherein said second cylindrical arrestor of said second set of isolated vertical type three-phase cylindrical arrestors is located intermediate, along said first direction, of said first and third cylindrical arrestors of said second set of isolated vertical type three-phase cylindrical arrestors, a distance between said first and third cylindrical arrestors of said second set of isolated vertical type three-phase cylindrical arrestors in said first direction as a measurement axis being less than the diameter of said second cylindrical arrestor of said second set of isolated vertical type three-phase cylindrical arrestors; and three second leading-out buses extending in the second direction and having substantially equal lengths, each of said second leading-out buses connecting one of said second set of isolated three-phase main buses with one of said second set of isolated vertical type three-phase cylindrical arrestors of a corresponding phase.

6. A gas insulated switchgear according to claim 5, wherein said three first connecting buses extend in a straight line from said respective ones of said first and second sets of isolated three-phase main buses to said one of said first set of gas insulated three-phase switchgear units of a corresponding phase via said respective disconnecting switches; and wherein said three second connecting buses extend in a straight line from said respective ones of said first and second sets of isolated three-phase main buses to said one of said second set of gas insulated three-phase switchgear units of a corresponding phase via said respective disconnecting switches.

* * * * *